(12) United States Patent
Kubic et al.

(10) Patent No.: US 8,448,754 B2
(45) Date of Patent: May 28, 2013

(54) DISC BRAKE

(75) Inventors: Olivier Kubic, Orsay (FR); Eric Lemoine, Asnieres (FR)

(73) Assignee: Chassis Brakes International B.V., Amsterdam (NL)

( * ) Notice: Subject to any disclaimer, the term of this patent is extended or adjusted under 35 U.S.C. 154(b) by 1015 days.

(21) Appl. No.: 11/934,126

(22) Filed: Nov. 2, 2007

(65) Prior Publication Data

US 2008/0105501 A1 May 8, 2008

(30) Foreign Application Priority Data

Nov. 2, 2006 (FR) ...................................... 06 09686

(51) Int. Cl.
*F16D 55/18* (2006.01)

(52) U.S. Cl.
USPC ......... 188/72.4; 188/73.1; 188/370; 277/345; 277/587

(58) Field of Classification Search
USPC ....................... 188/151 R, 152, 361, 369, 370
IPC ... F16D 65/14,65/16, 65/20, 55/18; F16J 15/32, F16J 15/02; F15B 15/20
See application file for complete search history.

(56) References Cited

U.S. PATENT DOCUMENTS

| | | | | |
|---|---|---|---|---|
| 2,019,757 A | * | 11/1935 | Loweke | 277/453 |
| 2,658,808 A | * | 11/1953 | Kaiser | 277/436 |
| 2,844,423 A | * | 7/1958 | Arnold | 277/436 |
| 3,041,077 A | * | 6/1962 | Osterloh et al. | 277/625 |
| 3,377,076 A | * | 4/1968 | Burnett | 277/582 |
| 3,600,045 A | * | 8/1971 | Inoue | 92/248 |
| 3,915,461 A | | 10/1975 | Gautier | |
| 4,053,030 A | | 10/1977 | Bainard et al. | |
| 4,058,084 A | * | 11/1977 | Kawaguchi et al. | 188/71.8 |
| 4,109,921 A | * | 8/1978 | Urbaschek | 277/452 |
| 4,156,532 A | * | 5/1979 | Kawaguchi et al. | 277/587 |
| 4,346,685 A | * | 8/1982 | Fujikawa | 123/193.6 |
| 4,387,901 A | * | 6/1983 | Ritsema | 277/584 |
| 4,676,143 A | * | 6/1987 | Nomura et al. | 92/243 |
| 5,050,892 A | * | 9/1991 | Kawai et al. | 277/436 |
| 5,076,593 A | * | 12/1991 | Sullivan et al. | 277/565 |
| 5,267,738 A | * | 12/1993 | Vos | 277/641 |
| 5,325,940 A | * | 7/1994 | Rueckert et al. | 188/71.8 |
| 5,826,681 A | * | 10/1998 | Kubo et al. | 188/71.8 |
| 6,044,936 A | * | 4/2000 | Matsumoto et al. | 188/72.4 |

(Continued)

FOREIGN PATENT DOCUMENTS

DE  3247052 A1  6/1984
GB  1512778 A  *  6/1978
GB  2129878 A  *  5/1984

OTHER PUBLICATIONS

FR06 09686 Search Report and Opinion.

*Primary Examiner* — Thomas Irvin
(74) *Attorney, Agent, or Firm* — Michael Best & Friedrich LLP

(57) ABSTRACT

Disc brake comprising an hydraulic actuator for clamping shoes guided by a caliper (14) and an annular seal (10) lodged with axial clearance (J) in a groove (28) of the actuator for ensuring fluid-tightness between the piston (16) and the cylinder of the actuator, characterized in that the groove (28) comprises a rib (40) for the axial locking of the seal (10).

11 Claims, 3 Drawing Sheets

U.S. PATENT DOCUMENTS

| | | | |
|---|---|---|---|
| 6,244,393 B1 * | 6/2001 | Weidenweber et al. | 188/72.4 |
| 6,347,689 B1 * | 2/2002 | Ohishi | 188/72.4 |
| 6,431,552 B1 * | 8/2002 | Ulrich | 277/558 |
| 7,191,875 B2 * | 3/2007 | Kurimoto et al. | 188/72.4 |
| 7,249,660 B2 * | 7/2007 | Mackiewicz | 188/326 |
| 2005/0173215 A1 * | 8/2005 | Watarai et al. | 188/370 |

* cited by examiner

DISC BRAKE

BACKGROUND OF THE INVENTION

The invention relates to a disc brake, in particular for a motor vehicle.

A disc brake comprises two shoes placed on either side of a disc integral in rotation with a wheel of a vehicle, these shoes being clamped on the faces of the disc, in order to develop a braking torque, by hydraulic pressure developed in a braking circuit controlled by the driver acting on a brake pedal.

In general, the shoes are guided by a caliper which is linked by an assembly, sliding along the axis of rotation of the disc, with a fixed yoke. The caliper comprises a blind cylinder in which a piston receiving the hydraulic pressure of the braking circuit is pushed so that it bears on the back of a shoe. The sliding assembly of the caliper makes it possible to distribute the braking forces equally between the two shoes.

An annular seal with a rectangular cross-section is fitted in a groove of the cylinder and comprises a face maintained in pressure against the piston in order to achieve fluid-tightness with respect to the hydraulic fluid acting on the piston.

The width of the groove is greater than that of the seal in order to leave an axial clearance between the seal and the groove to facilitate the assembly and to make it possible to absorb dimensional variations resulting for example from the compression of the seal, manufacturing tolerances or from an expansion of the seal due to heating or to its impregnation by the liquid present.

In a known production, the groove has a cross-sectional shape which widens towards the axis in order to lock as much as possible the outer peripheral part of the seal whilst allowing its inner peripheral part to move axially, following the piston. Thus, for a small movement of the piston produced during a braking, over a travel for example of the order to 0.5 millimeters, the face of the seal in contact with the piston is driven by friction with the piston and the seal undergoes an elastic deformation.

When the driver releases his action on the brake pedal, the seal, regaining its shape, drives the piston which is drawn backwards, which makes it possible to detach the shoes from the disc and thus to prevent residual braking causing wear of the friction pads.

However, the coefficients of friction of the seal on the piston and on the bottom of the groove are difficult to control and the functioning can differ in certain cases. In particular during a retraction of the piston over a larger travel, for example under the effect of a thrust of the disc undergoing lateral forces during a turn, the seal can move axially in its groove and move back with the piston within the limit of the axial clearance.

The functioning of the system is thus disturbed: during the next braking the seal moves with the piston and no longer provides the elastic return function and the sensation at the pedal is modified, which is unpleasant for the driver.

SUMMARY OF THE INVENTION

The purpose of the invention, in particular, is to avoid these disadvantages by means of a simple, efficient and economic system making it possible to control the position of the seal in the groove.

For this purpose, it proposes a disc brake comprising a hydraulic actuator for clamping shoes guided by a caliper and an annular seal lodged with axial clearance in a groove of the cylinder of the actuator in order to ensure fluid-tightness between the piston of the actuator and the cylinder, characterized in that it comprises a means of axially locking the seal in the groove, this means locking the seal in the rearward direction and allowing its forward movement in the direction of the brake disc.

One advantage of the brake according to the invention is that it allows an easy assembly of the seal because of the presence of the axial clearance whilst allowing constant functioning due to the axial immobilisation of the seal.

According to a preferred embodiment of the invention, the axial locking means is a continuous annular protrusion formed in the bottom of the groove.

According to a particular embodiment, the annular protrusion is a rib forming a point facing forwards and penetrating into the compressed elastic material of the seal.

According to another particular embodiment, the annular protrusion is a step connecting a front part of the bottom of the groove having a larger diameter and a rear part having a smaller diameter.

The bottom of the groove can successively comprise, along the axis, several annular protrusions ensuring the locking of the seal.

These annular protrusions can be formed by a regular succession of serrations each having a point facing forwards.

BRIEF DESCRIPTION OF THE DRAWINGS

The invention will be better understood and other features and advantages will appear more clearly on reading the following description given by way of example with reference to the appended drawings in which.

DETAILED DESCRIPTION

Figure 1A:
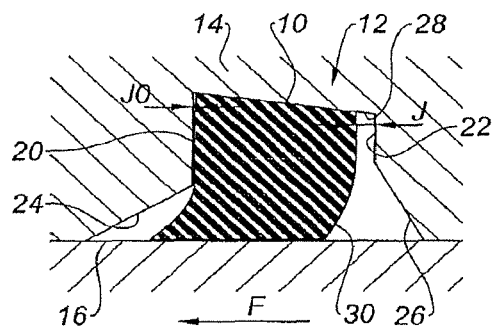
FIGS. 1a and 1b are a cross-sectional view of an annular seal fitted in a groove according to the prior art, in two positions.
Figure 1B:
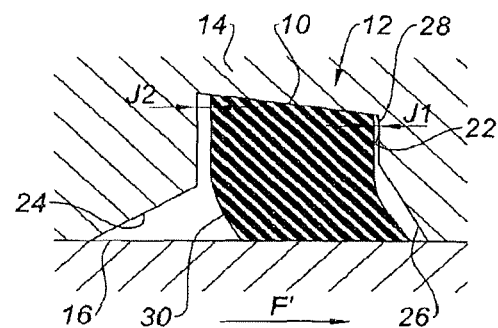

FIGS. 1a and 1b show, in two different positions, a seal 10 seen in cross-section through a plane passing through the axis of the cylinder of an actuator of a brake caliper 14. The seal 10 has a cross-section that is globally rectangular and is inserted in a groove 12 having a complementary cross-section formed in a bore of the caliper 14 forming a guide cylinder for a piston 16.

The groove 12 comprises front 20 and rear 22 lateral faces situated axially on either side of the seal 10 in order to carry out its guidance and to keep it in position, the front face 20 being on the side nearest to the disc, the rear face 22 being on the side furthest from the disc. In the position shown in FIG. 1a, a lateral clearance J is formed between the seal 10 and the rear face 22.

The seal 10 bears against the bottom of the groove 28 in order to apply, by its face facing the axis of the cylinder, a pressure on the axially sliding piston 16, which ensures fluid-tightness with respect to the hydraulic driving fluid.

The front face 20 comprises, at the entrance of the groove, an annular chamfer 24 which leaves a clearance between the caliper 14 and the piston 16, another chamfer 26 being formed in the rear face 22.

The arrow F in FIG. 1a indicates the direction of movement of the piston 16 for clamping the shoes on the disc under the effect of a hydraulic pressure controlled by the driver. The part 30 of the seal 10 bearing on the piston 16 is driven forwards on the piston whilst axially deforming and penetrates the clearance formed by the chamfer 24. The seal is retained by the front face 20 of the groove 12, a small clearance J0 due to a slight rocking of the seal being able to appear along the front face 20.

The travel of the piston 16 during a normal braking is generally between 0.2 and 0.5 millimeters and makes it possible to take up the clearances between the shoes and the disc and to absorb the elasticities of the various components. When the driver releases the pressure, the seal 10 rights itself and drags the piston 16 backwards, in the direction of the arrow F', returning it to the starting position.

The bottom of the groove 28 is frustroconical and slightly inclined with respect to the axis as it becomes more distant from the front side of the actuator. This slope of the order of 7° facilitates a maintaining of the seal 10 bearing on the front face 20, the seal being less compressed on this side.

Moreover, the dimensions of the seal are designed such that the pressure is greater on the bottom of the grove 28 than on the piston 16, in such a way as to favour the sliding of the seal over the latter rather than over the bottom of the groove.

In certain operating conditions, for example during a small axial movement of the disc due to lateral forces applied on the vehicle during turns, the piston 16 can be pushed towards the rear by the disc, the part 30 of the seal 10 in contact with the piston 16 deforming towards the rear and penetrating into the space formed by the chamfer 26 as shown in FIG. 1b.

The coefficients of friction of the seal on the bottom of the groove and on the piston are difficult to control and despite the precautions taken in order to keep the seal in place, the piston 16 can drag the seal 10 towards the rear and it becomes detached from the front face 20 with the formation of a clearance J2, the rear clearance J reducing in order to become J1.

The functioning during the following brakings are therefore disturbed, the whole of the seal 10 moving towards the front on braking such that the rearward return of the piston is poorly applied and can induce a residual friction of the shoe on the disc. Moreover, the sensations on the pedal can also be modified which is uncomfortable for the driver.

Figure 2A:
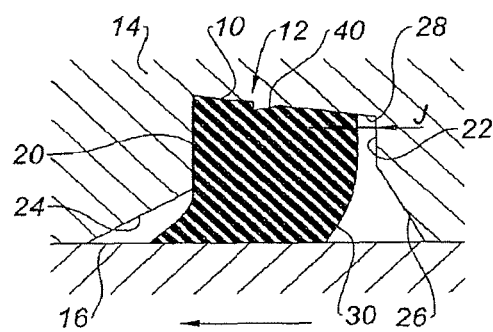
FIGS. 2a and 2b are a cross-sectional view of an annular seal fitted in a groove according to the invention.
Figure 2B:
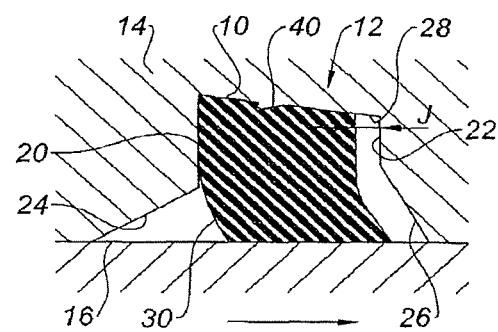
Figures 5, 6:
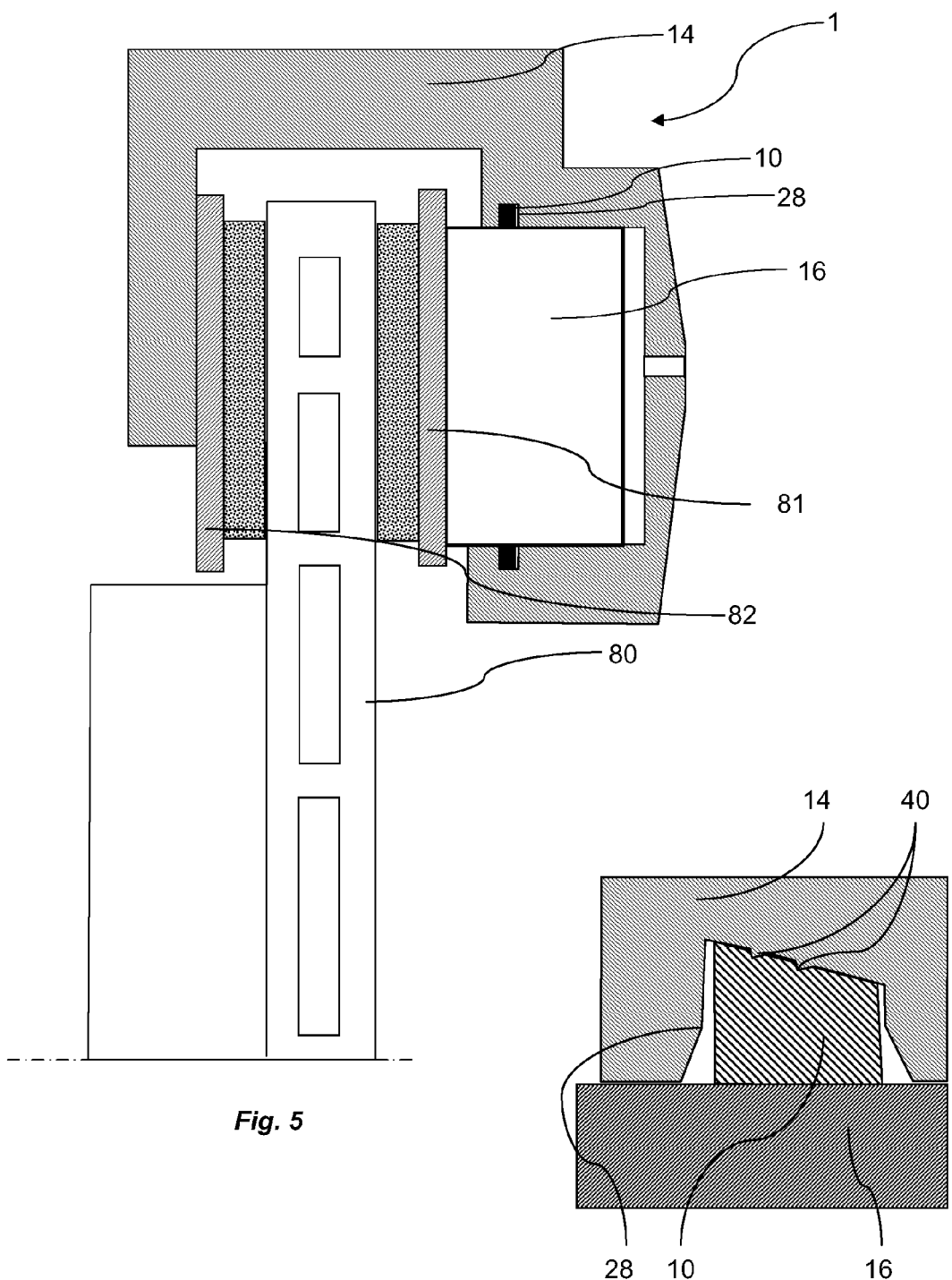
FIG. 5 is a schematic representation of a disc brake.
FIG. 6 is a schematic representation of successive annular ribs in the groove.

FIG. 5 schematically illustrates a disc brake 1. The disc brake 1 generally includes a caliper 14 with a groove 12 (see FIG. 2a) for the seal 10 and a piston 16. The disc brake 1 also includes a disc 80, and inner and outer shoes 81, 82. FIGS. 2a and 2b show a first axial locking device according to the invention, the piston 16 being in the forward position and in the rear position respectively. The bottom 28 of the groove 12 comprises an annular rib 40 of constant cross-section, continuous around the axis of the piston 16, and which comprises on the front side a radial face and on the rear side a frustroconical face with a slight slope.

This rib comprises a peak edge forming a point facing forwards and penetrating into the elastic material of the seal 10 compressed in the bottom of the groove, this point being orientated such that the seal can advance towards the front of the actuator without being able to retract, in the manner of a ratchet. This makes it possible, during the first operations of the brake after assembling the assembly, for the seal 10 to become pressed against the front face 20 of the groove and prevents the subsequent retraction of the seal.

The seal 10 then works under good conditions, it cannot move and the clearance J remains constant, it deforms elastically by following the movements of the piston 16 for the small movements and ensures an efficient return of the piston.

As a variant, it would be possible to produce (see FIG. 6) several successive annular ribs 40 regularly spaced along the axis in order to produce a better locking of the seal.

Figure 3A:
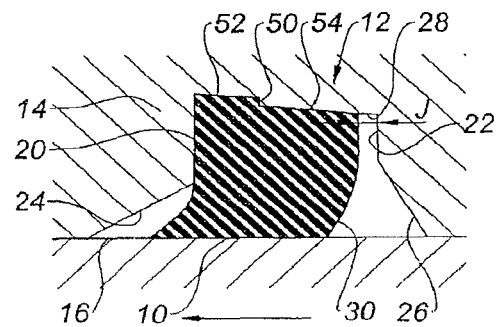
FIGS. 3a and 3b show a variant embodiment.
Figure 3B:
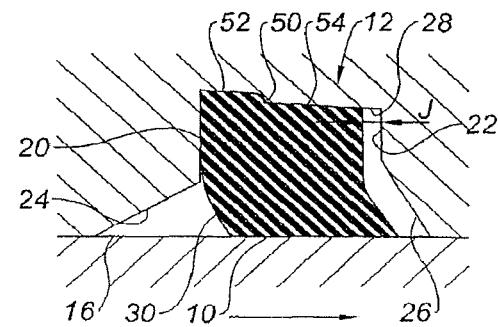

FIGS. 3a and 3b show a second axial locking device according to the invention. The bottom 28 of the groove 12 comprises an annular and continuous step 50 comprising a substantially flat annular radial face which connects a front part 52 of the bottom of the groove having a bigger diameter and a rear part 54 having a smaller diameter.

This step 50 comprises a peak edge which penetrates into the elastic material of the seal 10 and which, as for the first device, is oriented in such a way as to allow a movement of the seal 10 towards the front face 20.

Figure 4:
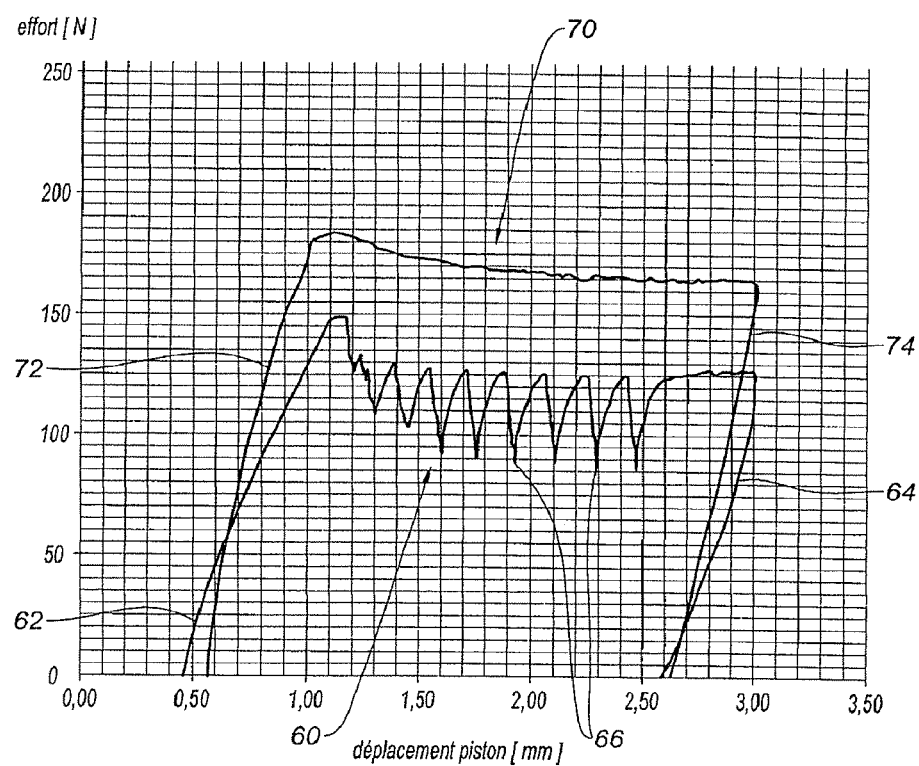
FIG. 4 shows curves of the driving force of a piston.

FIG. 4 shows curves of the displacement force of a piston 16, with the piston movement plotted horizontally in millimeters and the force applied to this piston plotted vertically in newtons. The curve 60 corresponds to the prior art and the curve 70 corresponds to a device according to the invention.

The curve 60 comprises a first rising part 62 representing the regular elastic deformation of the seal during the rise in pressure, over a travel of about 0.5 millimeters, then a series of peaks 66 over a travel of about 2 millimeters and over a sudden variation of the force of about 40 newtons, the movement of the seal in the groove occurring with a succession of detachments and attachments creating a chattering. The curve 60 then comprises a flat part in which the seal is bearing against the front face of the groove and the piston is sliding normally in the seal.

Then, at the end of the braking, the force is eliminated at 64 and the seal rights itself causing a retraction of the piston over a return travel of about 0.4 millimeters.

The curve 70 comprises a first rising part 72 corresponding to the elastic deformation of the seal in a regular manner during the rise in pressure, over a travel of about 0.5 millimeters. Then the curve becomes generally flat over a travel of about 2 millimeters, the piston sliding normally with respect to the seal without jolts.

At the end of the braking, the force is eliminated at 74 and the seal rights itself causing a retraction of the piston over about 0.4 millimeters.

In a variant embodiment, one or more ribs could be produced protruding from the face of the seal which is bearing on the bottom of the groove, and one or more corresponding channels in the bottom of the groove in order to ensure the axial locking of the seal in the groove.

The invention claimed is:

1. A disc brake for a motor vehicle, the disc brake comprising a caliper (14) operable to guide shoes and an annular seal (10) lodged in a groove of a cylinder of a brake actuator in order to ensure fluid-tightness between a piston (16) of the actuator and the cylinder, characterized in that the groove has an axial forward surface, an axial rearward surface and a radial bottom surface, in that the seal has a forward surface engageable with the forward surface of the groove, a rearward surface facing the rearward surface of the groove and a radial outer surface engaging the bottom surface of the groove, the disc brake comprises a means (40) of axially locking the seal (10) in the groove, the means projecting radially from the bottom surface of the groove and penetrating into material of the seal, the means allowing forward movement of the seal in the direction of a brake disc and locking the seal in the rearward direction with a clearance (J) between the rearward surface of the seal and the rearward surface of the groove, characterized in that the axial locking means (40) comprises an annular rib protruding from the bottom surface of the groove (28).

2. A disc brake according to claim 1, characterized in that the annular rib (40) comprises a peak edge facing forwards and penetrating into the material of the seal (10).

3. A disc brake according to claim 2, characterized in that the bottom surface of the groove (28) comprises several annular ribs for locking the seal (10).

4. A disc brake according to claim 2, characterized in that the bottom surface of the groove (28) is a frustoconical surface whose diameter about its axis increases towards the brake disc.

5. A disc brake according to claim 1, characterized in that the bottom surface of the groove (28) comprises several annular ribs for locking the seal (10).

6. A disc brake according to claim 1, characterized in that the bottom surface of the groove (28) is a frustoconical surface whose diameter about its axis increases towards the brake disc.

7. A disc brake for a motor vehicle, the disc brake comprising a caliper (14) operable to guide shoes and an annular seal (10) lodged in a groove of a cylinder of a brake actuator in order to ensure fluid-tightness between a piston (16) of the actuator and the cylinder, characterized in that the groove has an axial forward surface, an axial rearward surface and a radial bottom surface, in that the seal has a forward surface engageable with the forward surface of the groove, a rearward surface facing the rearward surface of the groove and a radial outer surface engaging the bottom surface of the groove, the disc brake comprises an annular rib (40) protruding from the bottom surface of the groove and penetrating into material of the seal, the rib axially locking the seal (10) in the groove, the rib allowing forward movement of the seal in the direction of a brake disc and into engagement with the forward surface of the groove, locking the seal substantially against the forward surface of the groove, and preventing retraction of the seal in the rearward direction with a clearance (J) between the rearward surface of the seal and the rearward surface of the groove.

8. A disc brake according to claim 7, characterized in that the rib (40) comprises a peak edge facing forwards and penetrating into the material of the seal (10).

9. A disc brake according to claim 8, characterized in that the bottom surface of the groove (28) comprises several annular ribs for locking the seal (10).

10. A disc brake according to claim 7, characterized in that the bottom surface of the groove (28) is a frustoconical surface whose diameter about its axis increases towards the brake disc.

11. A disc brake according to claim 7, characterized in that the bottom surface of the groove (28) comprises several annular ribs for locking the seal (10).

\* \* \* \* \*